US012812036B2

(12) United States Patent
Ives et al.

(10) Patent No.: US 12,812,036 B2
(45) Date of Patent: Nov. 24, 2026

(54) DIALER HAVING INTEGRATED SCAM PROTECTION

(71) Applicant: T-MOBILE INNOVATIONS LLC, Overland Park, KS (US)

(72) Inventors: Derrick Lynn Ives, North Bend, WA (US); Melodie Magdalene Sobrenilla, Sumner, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 437 days.

(21) Appl. No.: 17/548,756

(22) Filed: Dec. 13, 2021

(65) Prior Publication Data

US 2023/0188644 A1 Jun. 15, 2023

(51) Int. Cl.

| | |
|---|---|
| ***H04M 3/436*** | (2006.01) |
| ***G06F 3/04817*** | (2022.01) |
| ***G06F 3/0482*** | (2013.01) |
| ***H04W 12/12*** | (2021.01) |

(52) U.S. Cl.

CPC ........ *H04M 3/436* (2013.01); *G06F 3/04817* (2013.01); *G06F 3/0482* (2013.01); *H04W 12/12* (2013.01)

(58) Field of Classification Search

CPC ............. H04M 1/72469; H04M 3/436; H04M 3/2281; H04M 3/42059; H04M 3/42051; H04M 3/42229; H04M 1/57; H04M 1/663; H04M 7/0078; H04M 11/00; H04M 3/4365; H04W 4/16; H04W 12/069; H04W 12/12; H04W 4/14; G06Q 20/407; G06Q 10/107; H04L 63/1416; H04L 65/1104; H04L 65/1079; H04L 51/212

See application file for complete search history.

(56) References Cited

U.S. PATENT DOCUMENTS

| | | | | |
|---|---|---|---|---|
| 10,455,085 | B1 * | 10/2019 | Roundy ................ | H04W 12/12 |
| 10,785,369 | B1 * | 9/2020 | Dashevskiy ........ | H04M 3/2281 |
| 10,972,602 | B1 * | 4/2021 | Lang ................. | H04M 3/42051 |
| 11,431,833 | B1 * | 8/2022 | Smith-Rose .......... | H04M 3/436 |
| 11,540,134 | B1 * | 12/2022 | Darak .................. | G06Q 20/407 |
| 2004/0037413 | A1 * | 2/2004 | Gosselin ........... | H04M 3/42229 379/207.15 |
| 2008/0292077 | A1 * | 11/2008 | Vinokurov ............ | H04M 3/436 379/142.04 |

(Continued)

*Primary Examiner* — Dustin Nguyen

(74) *Attorney, Agent, or Firm* — Shook, Hardy & Bacon L.L.P.

(57) ABSTRACT

Methods, devices, media, and systems are provided for scam protection. In aspects, a first device transmits an audio or textual communication to a recipient device. The recipient device may display identification data associated with the first device, such as a telephone number, location data, hardware information, and carrier information, for example. The identification data may be compared to authentication identification data and scam identification data stored in a central database and generated from reports from a plurality of user devices to determine an identity of the first device. As such, the recipient device may also display the determined identity of the first device (e.g., “IRS Scam”). Further, the recipient device may display a selectable icon, wherein a selection of the selectable icon causes a transmission of information relating to the identification data or the identity of the first device to a server.

19 Claims, 7 Drawing Sheets

(56) References Cited

U.S. PATENT DOCUMENTS

2010/0157853 A1* 6/2010 Li ........................ H04L 65/1079 707/E17.014
2011/0211685 A1* 9/2011 Liu ..................... H04L 65/1079 379/201.02
2011/0294478 A1* 12/2011 Trivi ..................... H04M 3/436 455/415
2012/0215861 A1* 8/2012 Smith .................. G06Q 10/107 709/206
2013/0203390 A1* 8/2013 Prokhorov ............. H04M 11/00 455/414.1
2013/0331073 A1* 12/2013 Balan ...................... H04W 4/16 455/415
2014/0004892 A1* 1/2014 Murynets ................ H04W 4/14 455/466
2014/0274171 A1* 9/2014 Cooper ................. H04L 51/212 455/466
2015/0249737 A1* 9/2015 Spievak ................ H04M 3/436 379/189
2016/0360036 A1* 12/2016 Ansari .................... H04M 1/57
2017/0142252 A1* 5/2017 Bhupati .............. H04M 3/2281
2018/0191896 A1* 7/2018 Beardow ........... H04M 1/72469
2018/0241647 A1* 8/2018 Baracaldo Angel ......................... H04L 63/1416
2019/0089661 A1* 3/2019 Rahat .................... H04L 51/212
2020/0336588 A1* 10/2020 Sial ................... H04M 3/42059
2021/0168238 A1* 6/2021 Adolphe ............. H04W 12/069
2021/0203781 A1* 7/2021 Quilici .............. H04M 3/42059
2021/0377389 A1* 12/2021 Combellas .......... H04M 3/4365
2022/0053092 A1* 2/2022 Zaki ...................... H04M 3/436
2022/0060520 A1* 2/2022 Carney Landow .......................... H04L 65/1104
2022/0345570 A1* 10/2022 Garg ..................... H04M 1/663
2023/0370545 A1* 11/2023 Nowicki ............... H04W 12/12
2024/0406227 A1* 12/2024 Pandit ................. H04M 7/0078

* cited by examiner

DIALER HAVING INTEGRATED SCAM PROTECTION

SUMMARY

The present disclosure is directed, in part, to wireless telecommunications and scam protection features associated with a device, substantially as shown in and/or described in connection with at least one of the figures, and as set forth more completely in the claims.

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, a device, method, media, and system for detecting scam communications are provided. In aspects, a first device transmits an audio or textual communication to a recipient device. In addition to providing a user options to answer or respond to the audio or textual communication, the recipient device also displays identification data associated with the first device and one or more selectable icons for providing feedback to a server regarding the identification data displayed to the user. For example, feedback that the incoming audio or textual communication is a scam may be automatically transmitted to the server, and the server may then update a central database comprising authenticated identification data and scam identification data received from a plurality of user devices using various wireless telecommunications carriers.

The one or more selectable icons may also provide an option to block the first device. The selection of the one or more selectable icons may be selected within a call duration of the audio communication received by the first device. For example, the selection may be made by the user the selection being made on a user interface displaying the identification data associated with the audio or textual communication.

BRIEF DESCRIPTION OF THE DRAWINGS

The present technology is described in detail herein with reference to the drawing figures, which are intended to be exemplary and non-limiting in nature, wherein.

DETAILED DESCRIPTION

Figure 1:
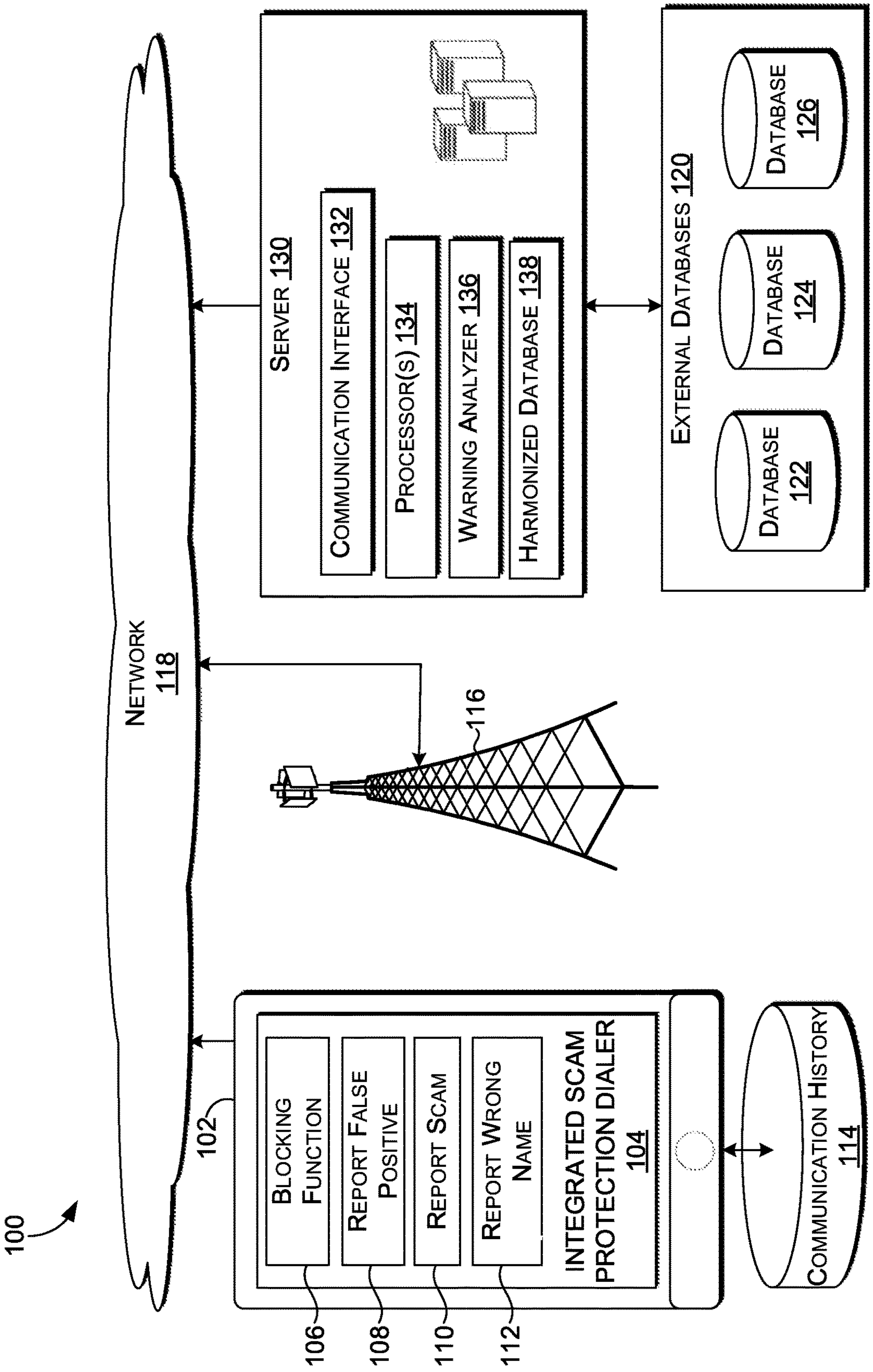
FIG. 1 depicts an example environment comprising a scam protection server and a device having a scam protection dialer, in accordance with an embodiment of the present technology.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms

| | |
|---|---|
| 3G | Third-Generation Wireless Technology |
| 4G | Fourth-Generation Cellular Communication System |
| 5G | Fifth-Generation Mobile Network |
| CD-ROM | Compact Disk Read Only Memory |
| CDMA | Code Division Multiple Access |
| CNAM | Caller Identification Name |
| CPU | Central Processing Unit |
| DVD | Digital Versatile Discs |
| EEPROM | Electrically Erasable Programmable Read Only Memory |
| eNB | Evolved Node B |
| ENUM | Electronic Numbers |
| Ev-DO | Evolution-Data Optimized |
| GPRS | General Packet Radio Service |
| GPS | Global Positioning System |
| GPU | Graphics Processing Unit |
| GSM | Global System for Mobile communications |
| GUI | Graphical User Interface |
| IMSI | International Mobile Subscriber Identity |
| LTE | Long Term Evolution |
| MMS | Multimedia Messaging Service |
| MSISDN | Mobile Station Integrated Services Digital Network |
| PC | Personal Computer |
| PDA | Personal Digital Assistant |
| RAM | Random Access Memory |
| RCS | Rich Communication Services |
| REST API | Representational State Transfer Application Protocol Interface |
| ROM | Read Only Memory |
| SMS | Short Message Service |
| TDMA | Time Division Multiple Access |
| T/R | Transmit/Receive |
| UE | User Equipment |
| VoIP | Voice over Internet Protocol |
| WiMax | Worldwide Interoperability for Microwave Access |

Additionally, as used in this disclosure, a "dialer" refers to a tool for navigating or managing incoming and outgoing communications, such as telephone calls or messages. For example, a user of a UE may utilize a dialer to manage contacts, switch between calls, create a conference call, delete messages, and so forth. A dialer may display numbers for a user to make an outgoing telephone call, for example. Additionally, the software functionality of a dialer may provide features for scrolling through a contact list.

In addition, the term "communication," as used herein with reference to a UE, refers to receiving or transmitting one or more signals. For example, a communication may include an audio communication, a textual communication, a visual communication, a haptic communication, and so forth. Further, the term "message" may include an audio message, a textual message, or a video message, for example. In an aspect, the audio message may include a voicemail. In some aspects, a textual message may be transmitted or received via an SMS text, MMS message, or RCS. In some aspects, the textual message includes an emoji or a virtual avatar representing a person, an action, an object, and so forth. Additionally, the textual message may include numbers, symbols, a logogram or letters corresponding to a version of the Latin alphabet, Aramaic alphabet, Egyptian hieroglyphics, and so forth.

The term "scam," as used herein, refers to an attempt to initiate a communication with a goal of obtaining something from the recipient, such as information (e.g., personal information for using the recipient's identification or credit card, for example). In some aspects, the goal is to obtain the information without explicitly informing the recipient of the true goal. In some aspects, scam calls include robocalls from an automatic dialer that delivers a pre-recorded message (e.g., the robocalls during the 2011 Canadian federal election used to dissuade voters from casting their ballot by falsely telling them their poll station location changed). In some aspects, scammers use caller ID spoofing to indicate to the recipient that the phone number is a number different than the legitimate phone number of the originator.

The term "category," with respect to being associated with a scam, refers to the type of information that the scam call is seeking to obtain (e.g., ID scam) or the entity that the scam caller is pretending to be (e.g., police scam). In some aspects, the category may identify the scammer as a political scammer, a business email compromise, or a debt scammer. In some aspects, the category may correspond to a risk level of the caller (e.g., high risk scammer).

A "mobile device," as used herein, is a device that has the capability of using a wireless communications network, and may also be referred to as a "computing device," "user device," "wireless communication device," or "UE." A mobile device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A UE may be, in an embodiment, similar to user device 900, described herein with respect to FIG. 9.

Further, the term "carrier" and "telecommunications carrier," as used herein, refer to an entity providing telecommunications services, including wireless communication. Furthermore, "wireless communication" and "wireless telecommunication," as used herein, refer to the transfer of information without the use of an electrical conductor as the transferring medium. Wireless communication may include, but is not limited to, the transfer of information via radio waves (e.g., Bluetooth®), satellite communication, infrared communication, microwave communication, Wi-Fi, and mobile communication. Wireless telecommunications may be facilitated by a wireless telecommunications network, such as network 118, described herein with respect to FIG. 1. For example, embodiments of the present technology may be used with different wireless telecommunication technologies or standards, including, but not limited to, CDMA 1×Advanced, GPRS, Ev-DO, TDMA, GSM, WiMax technology, LTE, and/or LTE Advanced, among other technologies and standards.

In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Embodiments of the technology may be embodied as, among other things, a method, a system, a device, and/or a computer-program product. Accordingly, the embodiments may take the form of a hardware embodiment, or an embodiment combining software and hardware. In one embodiment, the technology may take the form of a computer-program product that includes computer executable instructions embodied on one or more computer-readable media.

Computer-readable media may include both volatile media, non-volatile media, removable media, non-removable media, and contemplate media readable by a database, a switch, and/or various other network devices. Network switches, routers, and related components are conventional in nature, as are methods of communicating with the same. By way of example, and not limitation, computer-readable media may include computer storage media and/or communications media.

Computer-readable media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, DVD, holographic media or other optical disc storage, magnetic cassettes, magnetic tape, magnetic disk storage, and other storage devices. These memory components may store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, but not limitation, communications media may include wired media, such as a wired network or direct-wired connection, and wireless media such as acoustic, infrared, radio, microwave, spread-spectrum, and other wireless media technologies. Combinations of the above are included within the scope of computer-readable media. Communications media do not include signals per se.

In brief, and at a high level, this disclosure describes, among other things, a device as well as methods and systems for employing improved protections against scammers. Conventional methods and systems do not provide options for users to immediately indicate that a sender is or is not the identity that is being displayed by the carrier or by another service provider directly on the screen being displayed as a call or message is being received. Rather, any options the receiving device provides for the user require the user to take several additional and time-consuming steps, such as opening a web browser and submitting information, for example. These additional and inconvenient steps deter users from providing reports, updates, and information in real-time to assist carriers and other services in detecting scammers and notifying other telecommunications users of these scammers.

Furthermore, conventional methods and systems do not provide options for users to immediately block senders of calls and messages upon receipt of the call or message. Rather, conventional methods and systems require the user to take several additional and time-consuming steps, such as opening a contacts application for managing contacts and blocking the number from there, for example. These additional and inconvenient steps may deter users from blocking incoming communications. Some users, for example, may not know how to take the additional steps necessary to block an incoming communication. By providing the blocking option to the user as a communication is being received allows users to more efficiently manage their device.

Methods and systems that assist users to quickly report and block scammers is beneficial so that UE users do not have their identities or money stolen, for example. As the number of scammers using telecommunications networks continues to increase, the methods that scam callers use are continuously increasing and being improved relative to prior scamming methods. For example, some scam callers have been able to spoof legitimate phone numbers, such as the legitimate phone number of a city police station. Scam callers may use manual calls or robocalls for attempted communications with recipients of the calls. Recipients who respond to the scam communications (e.g., by audio, SMS text, MMS message, or RCS) may, to their own detriment, provide their financial information (e.g., bank account information or debit card information) or their personal information (e.g., a social security number).

The present disclosure provides for improvements to each of the deficiencies in the conventional systems described above. In one aspect, a device for having scam protection features is provided. In aspects, the device comprises a display, a processor, and a memory that stores executable instructions that, when executed by the processor, perform operations. The operations comprise receiving an incoming audio or textual communication. Additionally, the device displays, via the dialer on the display, a telephone number associated with the incoming audio or textual communication. Further, the device displays identification data associated with the telephone number and the incoming audio or textual communication. Furthermore, the device displays a selectable icon, wherein a selection of the selectable icon causes a transmission of information relating to whether the incoming audio or textual communication is associated with a scam. The dialer then receives the selection of the selectable icon and automatically transmits the information to a server.

In another example embodiment of the present technology, a method is provided for a dialer having scam protection features. For example, an incoming audio or textual communication is received. A dialer displays identification data associated with the incoming audio or textual communication. The dialer also displays a selectable icon associated with the identification data displayed. The selectable icon allows a user to provide feedback corresponding to the identification data displayed. A selection of the selectable icon is received via the dialer, wherein the selection is received via a user interface displaying the identification data and the audio or textual communication. In response to the selection, the feedback is automatically transmitted to a server.

In yet another example embodiment of the present technology, a server system is provided. For example, the system comprises a memory storing computer-executable instructions and a processor configured to access the memory and to execute the computer-executable instructions. The system receives a request to transmit an audio or textual communication to a recipient device from a first device, the first device being associated with identification data. In response to receiving the request, the system compares the identification data to both stored authenticated identification data and stored scam identification data. Based on comparing the identification data, the system transmits the audio or textual communication and an indication of an identity of the first device to the recipient device. The system then receives a response associated with the indication from the recipient device without the recipient device having to navigate to an interface other than the interface associated with the audio or textual communication and the indication of the identity.

Referring to the drawings in general, and initially to FIG. 1, example environment 100 for using a dialer having scam protection features comprises UE 102, which has an integrated scam protection dialer 104 having a blocking function 106, a feature for reporting false positives 108, a feature for reporting a scam 110, and a feature for reporting a wrong name 112. Further, example environment 100 also comprises cell site 116, network 118, external databases 120, and server 130. Server 130 may include a communication interface 132, one or more processors 134, a warning analyzer 136, and a harmonized database 138.

Example environment 100 is but one example, and is not intended to suggest any limitation as to the scope of use or functionality of the embodiments discussed herein. Neither should the environment 100 be interpreted as having any dependency or requirement relating to any one or a combination of components illustrated. It should be noted that although some components in FIG. 1 are shown in the singular, they may be plural. For example, the environment 100 may also include multiple networks, multiple cell sites, and multiple UEs.

Beginning with UE 102, the UE may take on a variety of forms including: a PC, a user device, a smart phone, a smart watch, a laptop computer, a mobile phone, a mobile device, a tablet computer, a wearable computer, a PDA, a server, a CD player, an MP3 player, a GPS device, a video player, a handheld communications device, a workstation, a router, a hotspot, and any combination of these delineated devices, or any other device (such as the computing device 900 in FIG. 9) that communicates via wireless communications to interact with a public or private network (e.g., network 118).

In aspects, UE 102 may be capable of communicating using 4G (e.g., LTE) and/or 5G. In some aspects, UE 102 may be E-UTRAN New Radio—Dual Connectivity devices (ENDC). ENDC allows a user device to connect to an LTE eNB that acts as a master node and a 5G gNB that acts as a secondary node. As such, in these aspects, UE 102 may access both LTE and 5G simultaneously, and in some cases, on the same spectrum band. As shown in FIG. 1, UE 102 may communicate by way of transmission with cell site 116 using one or more of 4G and 5G, sometimes simultaneously. Additionally, other wireless communication protocols may be utilized in conjunction with aspects described herein, as LTE and 5G are used as examples.

With respect to the integrated scam protection dialer 104, the dialer 104 may provide for Bluetooth calling, contact management, contact browsing, and other contact-related features, for example. The integrated scam protection dialer 104 may interact with other applications (e.g., other applications locally stored on the UE 102) and may provide notifications via a GUI of the UE 102. For example, integrated scam protection dialer 104 may notify a user of an incoming call or message. A user may interact with the integrated scam protection dialer 104 by voice command or by selections via the GUI, for example.

The integrated scam protection dialer 104 may comprise a blocking function 106, a feature for reporting false positives 108, a feature for reporting a scam 110, and a feature for reporting a wrong name 112. One or more of these features of the scam protection dialer 104 may displayed to a user upon receipt of a communication, such as a phone call or message (e.g., by audio, SMS text, MMS message, or RCS). For example, upon receipt of the communication, a GUI of the UE 102 may display a phone number and a selectable icon that permits the user to block the incoming phone number upon selection of the selectable icon. Upon selection of the selectable icon, the blocking function 106 may block incoming communications from that phone number by storing that number in a local index or a remote index, for example. In some aspects, the blocking function 106 may block all incoming communications associated with all phone numbers associated with a particular name identified as being associated with that phone number. In some aspects, only messages from the phone number displayed are blocked upon activation of the blocking function 106.

In some embodiments, the dialer 104 may include the feature for reporting the false positive 108. For example, upon receipt of a communication, the dialer 104 may display via the GUI that the incoming communication is a "social security scam." Continuing the example, the feature for reporting the false positive 108 may allow the user to report that the scam is a legitimate business or person. In some aspects, the user is able to report this directly to a carrier, a server of the carrier, or to a server of a third party. In some aspects, the report may include information indicating whether the user had answered the call prior to transmitting the report. In some aspects, the report may include a duration of the call. In some aspects, the user may be able to report that the scam is a legitimate scammer, but the scammer is now using a scam other than the social security scam.

Stated differently, the false positive reporting 108 may include an indication that the type of scam has changed. For example, upon selection of an icon to report the false positive 108, the dialer 104 may provide another selectable icon that indicates to server 130 that the type of previously determined scam has changed. Continuing the example, upon selection of the icon indicating the type of scam has changed, the dialer 104 may then present a list of selectable icons comprising various scam categories for updating the previously determined scam type. Selection of these various icons cause a transmission of data to server 130 to store in the harmonized database 138.

In some embodiments, the dialer 104 may include the feature for reporting a scam 110. For example, upon receipt of a communication, the dialer 104 may display the feature for reporting the scam 110 via the GUI without the user having to navigate to another application or to a location other than the screen in which the incoming communication notification is being provided. Further, the dialer 104 may provide identification data associated with the incoming communication. Identification data may include a name or description of an identity of the incoming communication (e.g., CNAM displayed by a service providing device or carrier, such as Kimberly Ryan, Video Platform A Invite, or Beth's Flowers). Identification data may also include, in some aspects, an address (e.g., a city based on the area code, a country based on the country code, an address registered or listed in a database as associated with the phone number), MSISDN, IMSI, other location data, hardware information, and carrier information. In some aspects, the identification data may include a uniform resource identifier, session initiation protocol invite information (e.g., header information, source IP address, incoming port number), and other caller information from a telecommunications carrier associated with a network that the sending device is using (e.g., subscription data to the telecommunications carrier).

In some aspects, dialer 104 displays the identification data associated with the incoming communication simultaneously with a notification that an incoming communication is being received. In some aspects, dialer 104 displays additional identification data upon a selection of an icon to provide the additional identification data. For example, selection of the icon may present the address and the other location data (e.g., a time zone). In aspects, the icon may be selected prior to answering the incoming telephone call, after answering the telephone call and during a conversation, after ending the telephone call, or prior to returning an incoming message. A user of the recipient device may use the additional identification data for determining whether to answer the incoming communication and for determining whether to use the feature for reporting a scam 110. Further, the feature for reporting the scam 110 may transmit the additional identification data to server 130.

In some embodiments, dialer 104 may transmit a transcript of a phone call conversation or a message received from the scammer to server 130 via the feature for reporting a scam 110. For example, the transcript of a phone call conversation may include a transcription of speech-to-text of telephony data analyzed after the call or during the call. The text of the telephony data may be analyzed for keywords. Additionally, dialer 104 may transmit other metadata associated with the phone call conversation or a text message received by UE 102 to server 130, such as a time of the duration of the call or a calling card number. In some aspects, dialer 104 stores data associated with incoming communications in communication history 114 or causes the data to be stored in harmonized database 138.

In some embodiments, the dialer 104 may include the feature for reporting the wrong name 112. For example, upon receipt of a phone call, the dialer 104 may display a name and address associated with the incoming phone number. Continuing the example, prior to answering the phone call or during the duration of the phone call, the user may utilize the feature for reporting the wrong name 112 by reporting that the name or address associated with the phone number is incorrect. In some embodiments, a user may utilize the feature for reporting the wrong name 112 by selecting the name displayed by the dialer 104. For example, upon selection of the displayed name, the user may be presented with an option to notify server 130 of the incorrect name. In aspects, the feature for reporting the wrong name 112 may provide an option to the user to type in and transmit the correct name to the server 130.

Turning to communication history 114, dialer 104 may cause the UE 102 to store information associated with the integrated scam protection dialer 104 in a local or external database. In one embodiment, the database corresponds with a memory that includes a set of embodied computer-executable instructions that, when executed, facilitate various aspects disclosed herein. In aspects, the database is a centralized database or a distributed database. In aspects, the database is associated with caches and servers that store one or more sets of computer-executable instructions. Communication history 114 stored may include a list of previously blocked phone numbers, a length of time that the previously blocked phone number was blocked for, a call length duration of a call prior to that number being blocked, text associated with communications with the phone numbers that have been blocked, and so forth.

Turning to cell site 116, the terms "cell site" and "base station" may be used interchangeably herein to refer to a defined wireless communications serviceable area that is serviced by a base station. Cell site 116 may provide for the wireless communications via network 118. Cell site 116 may communicate (by receiving or transmitting) with UE 102 and server 130, as well as other UEs and servers (not depicted). In example environment 100, UE 102 and server

130 are located within a serviceable area defined by a transmission range and/or receiving range of an antenna array of the cell site 116.

Cell site 116 may include one or more base stations, carriers, band pass filters, radios, antennas, antenna arrays, power amplifiers, transmitters/receivers, digital signal processors, control electronics, GPS equipment, and the like. As discussed herein, cell site 116 controls and facilitates, via one or more antenna arrays, the broadcast, transmission, synchronization, and receipt of one or more wireless signals in order to communicate with, verify, authenticate, and provide wireless communications service coverage to one or more UEs and/or other types of devices that request to join and/or are connected to the network 118.

In some aspects, cell site 116 may comprise one or more macro cells (providing wireless coverage for users within a large serviceable area). For example, macro cells may correspond to a coverage area having a radius of approximately 1-15 miles or more, the radius measured at ground level and extending outward from an antenna at the cell site 116. In some aspects, cell site 116 is in communication with one or more small cells (providing wireless coverage for users within a small geographic area). For example, a small cell may correspond to a coverage area having a radius of approximately less than three miles, the radius measured at ground level and extending outward from an antenna at the cell site 116. In aspects, the one or more small cells are located in an indoor environment. In some embodiments, one or more small cells and one or more macro cells establish network 118, forming a heterogeneous network.

Cell site 116 may comprise an antenna array having one or more antenna elements (e.g., a dipole antenna having a length of ¼, ½, 1, or 1&½ wavelengths). In aspects, the antenna array may be an active antenna array, FD-MIMO, massive MIMO, 3G, 4G, 5G, another generation communication system, and/or 802.11. In other aspects, the antenna array may comprise monopole, loop, parabolic, traveling-wave, aperture, yagi-uda, conical spiral, helical, conical, radomes, horn, and/or apertures, or any combination thereof. In some aspects, each antenna element has a dedicated power supply, a power amplifier, and a processor for controlling or adjusting the power supply.

Turning to network 118, network 118 may be a telecommunications network(s), or a portion thereof. In aspects, telecommunications network(s) might include an array of devices or components (e.g., one or more base stations), some of which are not shown. For example, components (e.g., terminals, links, nodes) may provide connectivity in various implementations. Network 118 may include multiple networks, as well as being a network of networks, but is shown in more simple form so as to not obscure other aspects of the present disclosure.

Network 118 may be part of a telecommunication network that connects subscribers to their service provider. In aspects, the service provider may be a telecommunications service provider, an Internet service provider, or any other similar service provider that provides at least one of voice telecommunications and data services to any or all of the user devices within network 118. For example, network 118 may be associated with a telecommunications provider that provides services (e.g., LTE) to UE 102. The network 118 may also be, in whole or in part, or have characteristics of, a self-optimizing network.

Turning to server 130, server 130 comprises communication interface 132, processor(s) 134 (e.g., a CPU, a GPU, a combination of the CPU and GPU, or another processing unit or component), warning analyzer 136, and harmonized database 138. Server 130 may be a telephony application server that assists and manages phone call communications. In some aspects, the server 130 is another type of application server. In some aspects, server 130 manages various messages, such as text messages, multimedia messages, video calls or messages, and other types of communications. In some aspects, the server to which an invite for communication is routed is a telephony application server.

In some aspects, dialer 104 detects the receipt of an incoming communication (transmitted by a transmitting device and intended for receipt by UE 102, for example) and simultaneously receives data from server 130 via communication interface 132. In aspects, communication interface 132 facilitates communications with a plurality of clients (e.g., UE 102 and other UEs not depicted). In some aspects, the incoming communication is transmitted from a device (e.g., a UE not depicted) that is transmitting communications using a carrier other than the carrier of the recipient device (e.g., UE 102). In some aspects, the incoming communication is transmitted over Wi-Fi. In some aspects, server 130 is operated by the carrier of the recipient device.

Upon transmission of a communication to a recipient device, server 130 may query the harmonized database 138 using a REST API query, an ENUM query, and other types of queries, for example. With respect to harmonized database 138, the harmonized database 138 compiles identification data (e.g., MSISDN and other header information from an incoming communication) and other data associated with scam communications (e.g., a scam category) from a plurality of other database sources, such as databases 122-126 that are external databases 120, for example. In some aspects, databases 122-126 are each managed by a different type of application server. In some aspects, databases 122-126 are each associated with a different telecommunications carrier. The harmonized database 138 may be volatile (e.g., RAM), non-volatile (e.g., ROM, flash memory), or a combination of volatile and non-volatile.

In some aspects, harmonized database 138 standardizes the formatting of identification data from various external databases, such as databases 122-126, to allow for efficient queries of data from various sources having various formats of stored data. In some aspects, identification data is organized in the harmonized database 138 by telecommunications carrier, by country code, by area code, or by a number of reports of scam communications associated with particular header information, for example. In some aspects, the harmonized database 138 tags an MSISDN as being associated with scam communications based on one or more reports generated by a user of one or more telecommunications carriers. In some aspects, the tag is generated based on a plurality of data collected and stored by one or more third party applications. Further, one or more telecommunications carriers may identify the MSISDN as a scammer based on the tag.

Based on querying the harmonized database 138, warning analyzer 136 can determine (e.g., by utilizing processor(s) 134) that the identification data (and in some embodiments, the other data associated with scam communications) indicates that an incoming communication is a scam. For example, warning analyzer 136 can determine the communication is a scam based on a number of scams reported by various users (e.g., various UE users), wherein the reports from the various users included one or more equivalent or similar identification data associated with the incoming communication. The various users may include users of telecommunications carriers different from the telecommunication carrier of the transmitter of the incoming communication. In aspects, the incoming communication has the same MSISDN, IMSI, or hardware information as an identified scammer. In aspects, the incoming communication has the same header information, source IP address, or incoming port number as an identified scammer.

In some aspects, warning analyzer 136 can determine an incoming communication is a scam based on data associated with a verified user (e.g., user of UE 102). For example, UE 102 may be associated with particular identification information registered with a telecommunications carrier, a trusted third party application that is trusted by server 130, or verified independently by server 130. In aspects, the data associated with the verified user may include a contact list the verified user shared with server 130 and stored in the harmonized database 138. In some aspects, the warning analyzer 136 can determine an incoming communication is a scam based on call histories (e.g., length of telephone conversations) of verified users. For example, if the length of each telephone conversation associated with a particular piece of header information is below a number of seconds, that header identifier may be tagged as a scammer.

In some aspects, a device or transmitted communication is identified as a scammer based on a number of UE users reporting the associated identification data as being associated with one or more scam communications. In some aspects, a device or transmitted communication is identified as a scammer based on messages received by the number of UE users who were prior targets of the scammer In some aspects, a device or transmitted communication is identified as a scammer based on call durations (i.e., the length of the telephone conversations) of a plurality of UE users who were prior targets of the scammer being below a threshold. In some aspects, an email address is identified as a scammer.

Based on determining the incoming communication is a scammer, server 130 may take a protective action, such as removing the MSISDN data and forwarding an invite associated with the incoming communication to UE 102 without the previous MSISDN data that was removed. In some aspects, the protective action includes displaying, via the display of the dialer 104, that the caller is a scam caller. In some aspects, the protective action includes displaying, via the display of the dialer 104, a category associated with the scam. For example, the warning analyzer 136 may determine a category of the scam communication based on user feedback (e.g., from users of one or more carriers). In aspects, the category may include one of the following: a technical support scam, a charity scam, a lottery scam, a bank scam, an emergency scam (e.g., indicating a relative is at the hospital receiving emergency services), a debt scam, and an insurance scam.

In some aspects, warning analyzer 136 determines a probability (e.g., a percentage) of the communication being a scammer and provides that probability for display via the dialer 104. For example, the warning analyzer 136 may determine the probability based on a number of reported incidences of scams associated with identification data of the incoming communication. In some aspects, warning analyzer 136 may determine a risk level of the caller (e.g., high risk scammer) rather than the probability and provide the risk level for display on the dialer 104. For example, health emergencies of a loved one may be a more successful scamming tactic than an IRS scam, and thus may be associated with having a higher risk. In some aspects, server 130 prevents transmission of the incoming communication to UE 102 based on the probability of the communication being a scammer satisfying a threshold.

Figure 2:
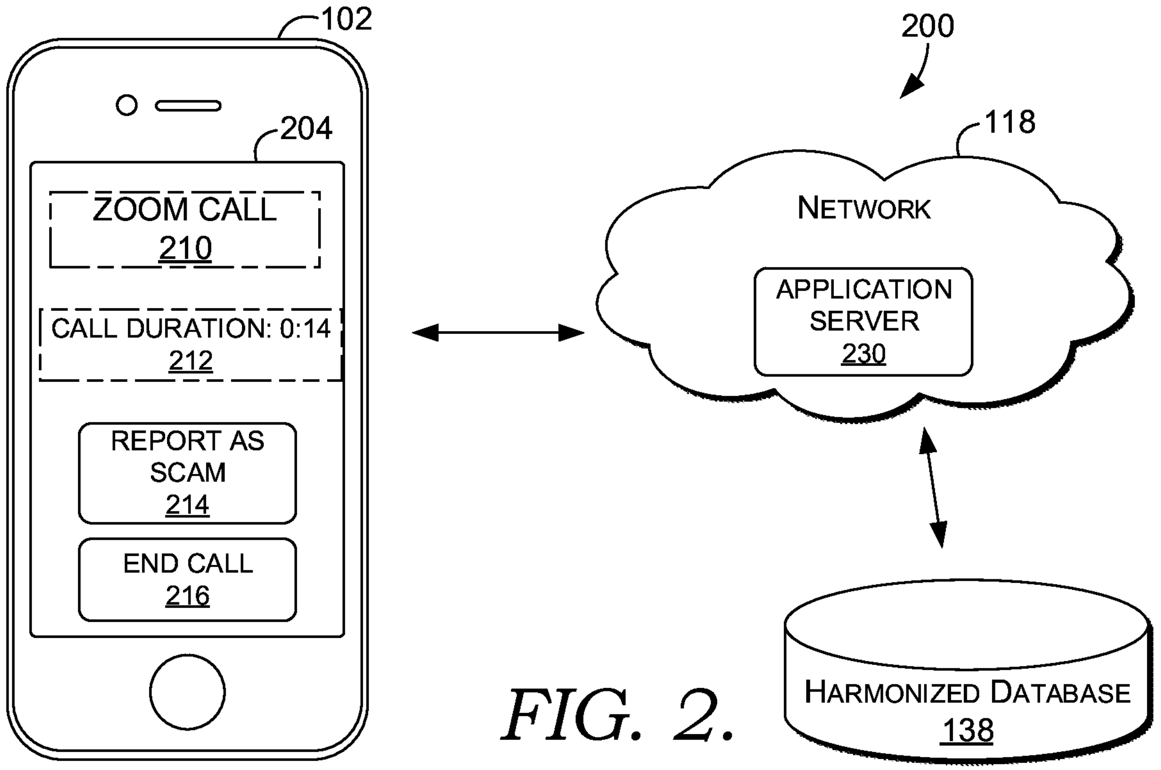
FIGS. 2-5 depict an example environment comprising the scam protection dialer having one or more selectable icons, in accordance with aspects of the present technology.

Turning to FIG. 2, example environment 200 comprises UE 102, network 118, and harmonized database 138, each of which are discussed in detail above in the discussion of FIG. 1. Additionally, example environment 200 comprises an embodiment of the integrated scam protection dialer 204, displayed identification data 210 associated with an incoming communication, displayed communication data 212 of the accepted incoming communication, and selectable icons 214 and 216 for providing feedback or a report to application server 230.

Identification data displayed at 210 via the dialer 204 may include a name of an entity trying to initiate communication with UE 102. In aspects, the name may indicate that the caller is a Video Platform A Invite, such as a Zoom call 210 invitation, for example. In other aspects, the name displayed at 210 may include the name of an individual attempting to initiate communication who is a known user of the device initiating communication. In some aspects, the duration of the phone conversation may be displayed at 212 upon the user of the UE 102 answering the invitation to communication. In aspects, dialer 204 presents selectable icon 214, wherein a selection of the selectable icon 214 causes a transmission of information relating to whether the incoming audio or textual communication is associated with a scam to the application server 230 (e.g., a telephony application server). In aspects, application server 230 is hosted in a cloud-computing environment for the identification and notification of scam communications.

In aspects, upon selection of selectable icon 214, the dialer 204 automatically transmits, to server 230, the information that the call is not the entity indicated at 210 but is instead a scam caller. As depicted in environment 200, dialer 204 provides the selectable icon 214 to the user so that the user may report the scam to the application server 230 within the call duration of the audio communication with the scammer. Further, selectable icon 214 is provided to the user via an interface associated with the identification data 210 and the audio communication with the scammer. In response to receiving the report that the entity indicated at 210 is incorrect, application server 230 may store the report and may tag identification information associated with the scam caller.

Figure 3:
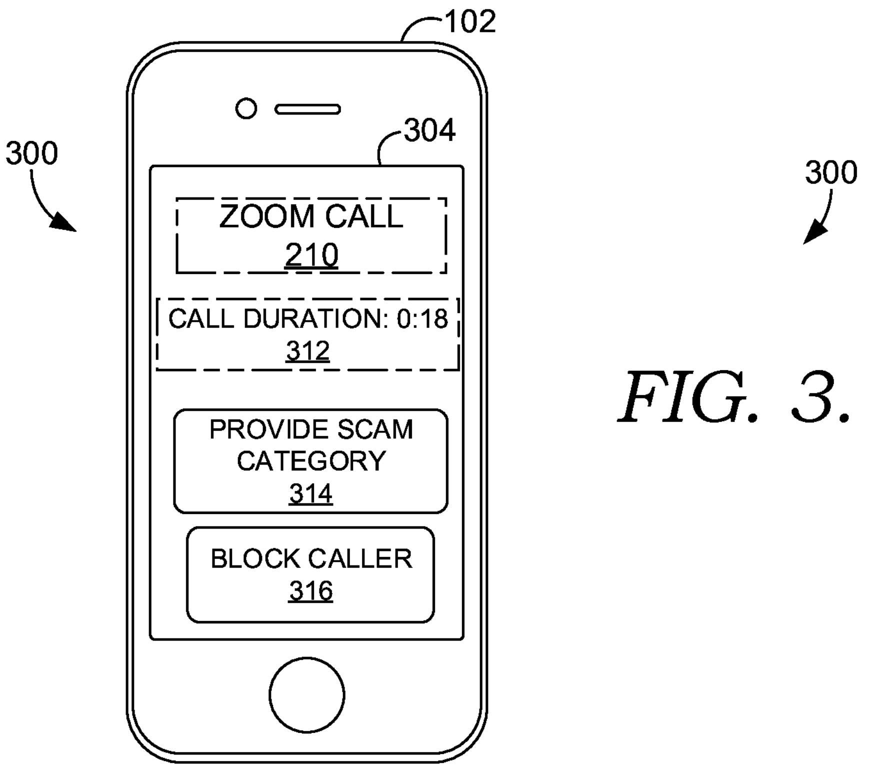

Turning to FIG. 3, example environment 300 includes an example embodiment wherein the integrated scam protection dialer 304 installed on UE 102 provides additional options for a user to take action in response to answering an audio communication from a scam caller. For example, upon selection of the user reporting the caller as a scam caller at 214 in FIG. 2, dialer 304 may provide the user with selectable icons 314 and 316 within the duration of the call, as indicated by the call duration 312. (In some embodiments not depicted, the selectable icons 314 and 316 may be displayed prior to selection of any other icon. Additionally, in some aspects, selectable icons 314 and 316 may be presented as a selectable list or as any other displayed means for selecting.)

If the user wishes to provide a scam category 314 to indicate which category the scam caller is associated with, the user may select the selectable scam category icon 314 during the call duration. In some aspects, the category icon 314 may be displayed to the caller after the duration of the call. In some aspects, upon selection of category icon 314, the dialer 304 may subsequently display a list of categories for selection by the user. Additionally, the user may select the block caller feature at 316 to add the caller to a blocked call list stored locally or at the harmonized database. In some aspects, block caller feature 316 may be displayed during or after the call duration. As illustrated in FIG. 3, a user may select to provide a scam category 314 or block the caller 316 via an interface associated with the identification data 210, for example.

Figure 4:
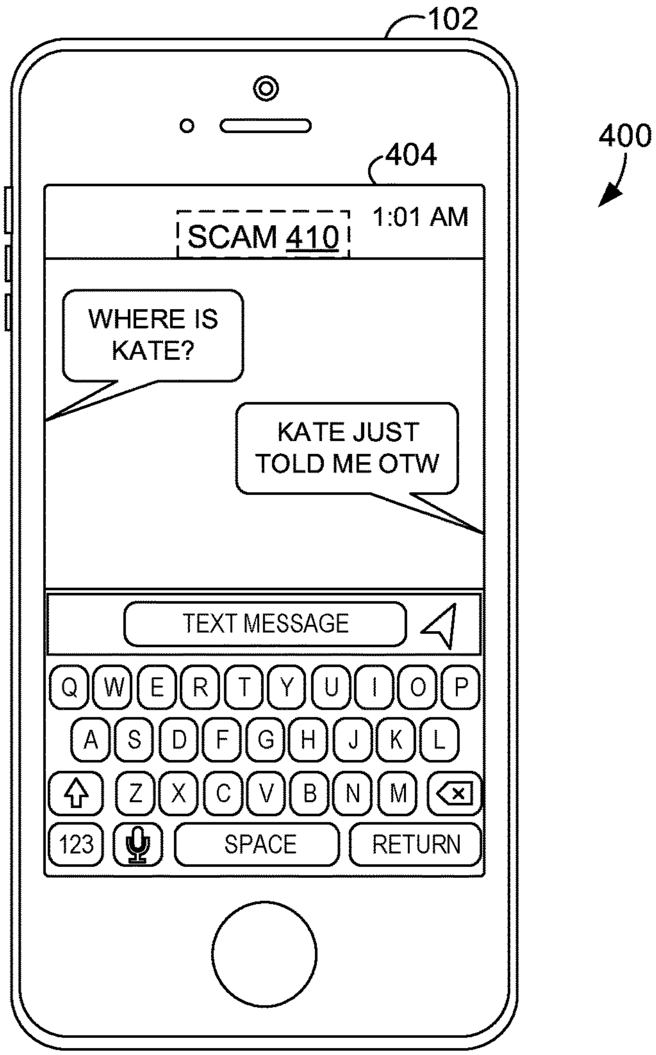
Figure 5:
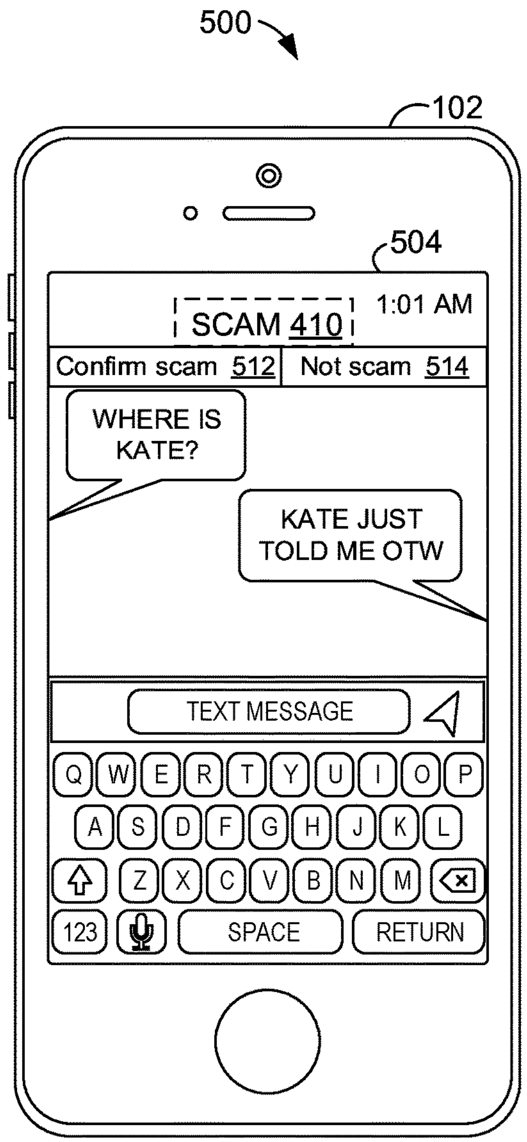

Turning now to FIG. 4, example environment 400 depicts UE 102 and an embodiment of the integrated scam protection dialer 404. The dialer 404, in example environment 400, displays an indication (e.g., label 410) that an incoming message (e.g., such as the textual message "Where is Kate?") is a scam message. In some aspects, the textual message is an SMS text, MMS message, or RCS, for example. FIG. 5 in example environment 500 depicts the scam indicator 410 in an example embodiment of dialer 504 in response to the user touching the scam indicator 410. In example environment 500, upon receiving the touch, confirm scam selectable icon 512 and the icon 514 that indicates the textual message is in fact not a scam are displayed. In some aspects (not depicted), the selectable icons 512 and 514 are provided and displayed by the dialer upon the initial receipt of the textual message and before the user of UE 102 responds to the textual message. In some aspects, a user may communicate through the dialer 504 and to a server that the textual message is not a scam 514 by a voice command or by shaking the UE 102 instead of selecting icon 514.

Figure 6:
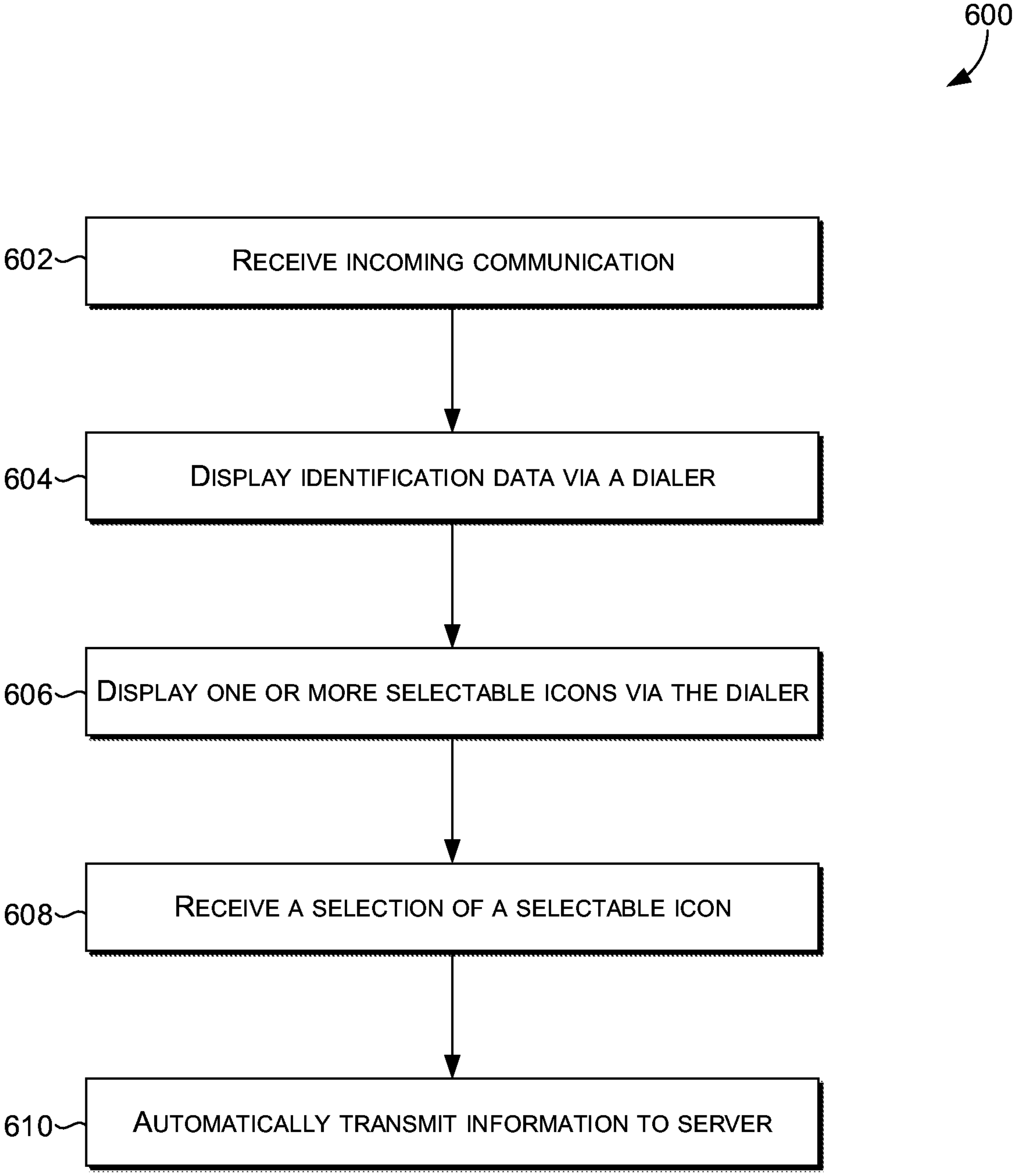
FIGS. 6-8 depict example flowcharts, in accordance with aspects of the present technology.

Turning now to FIG. 6, example flowchart 600 of a method from the perspective of a dialer application begins at 602 by receiving an incoming communication intended for communication with a user of a user device. For example, the incoming communication may be an audio or a textual communication. In response to receiving the audio communication, an indication (e.g., a selection or voice command) to answer the audio communication may be received. A user of the device having the dialer application and the caller may remain connected for audio communications for a call duration.

At 604, the dialer application may display identification data associated with the incoming communication via a GUI. In some aspects, identification data includes a telephone number. In some aspects, the telephone number includes a country code and an area code. In some aspects, identification data displayed includes a label that the caller is a "scam" caller. In some aspects, the label may also include a category of the scam caller. In some aspects, the identification data displayed includes a name associated with the telephone number, such as the name of an individual or the name of a business entity, for example. In some aspects, the identification data displayed further comprises location data associated with a second device that initially transmitted the audio or textual communication. For example, the location data may include a time zone associated with the area code of the telephone number or location data shared by the second device. For example, the second device may share its location data with the application server or with another application communicating with the application server. In some aspects, the identification data displayed further comprises a frequency band (e.g., 1900 MHz, 2600 MHz, or 2300 MHz) in which the audio or textual communication was transmitted.

At 606, the dialer displays one or more options for a user to cause an action, wherein the one or more options comprise a selectable icon, for example. In aspects, selection of the selectable icon causes the action of a transmission of information relating to whether the incoming audio or textual communication is associated with a scam. In some aspects, the selectable icon may be selected within a duration of an audio communication (e.g., during a telephone call). In some aspects, selection of the icon blocks the second device and adds identification data of the second device to a list of scammers stored in a harmonized database associated with the dialer application. In some aspects, selection of the icon transmits an indication that a label associated with the second device is incorrect. In some aspects, selection of the icon results in displaying a plurality of selectable indicators of categories to be indicated as associated with the scam.

At 608, a selection of the selectable icon is received. Upon selection of the icon, the dialer automatically causes a transmission of the information indicated by the selection to a server associated with the dialer at 610.

Figure 7:
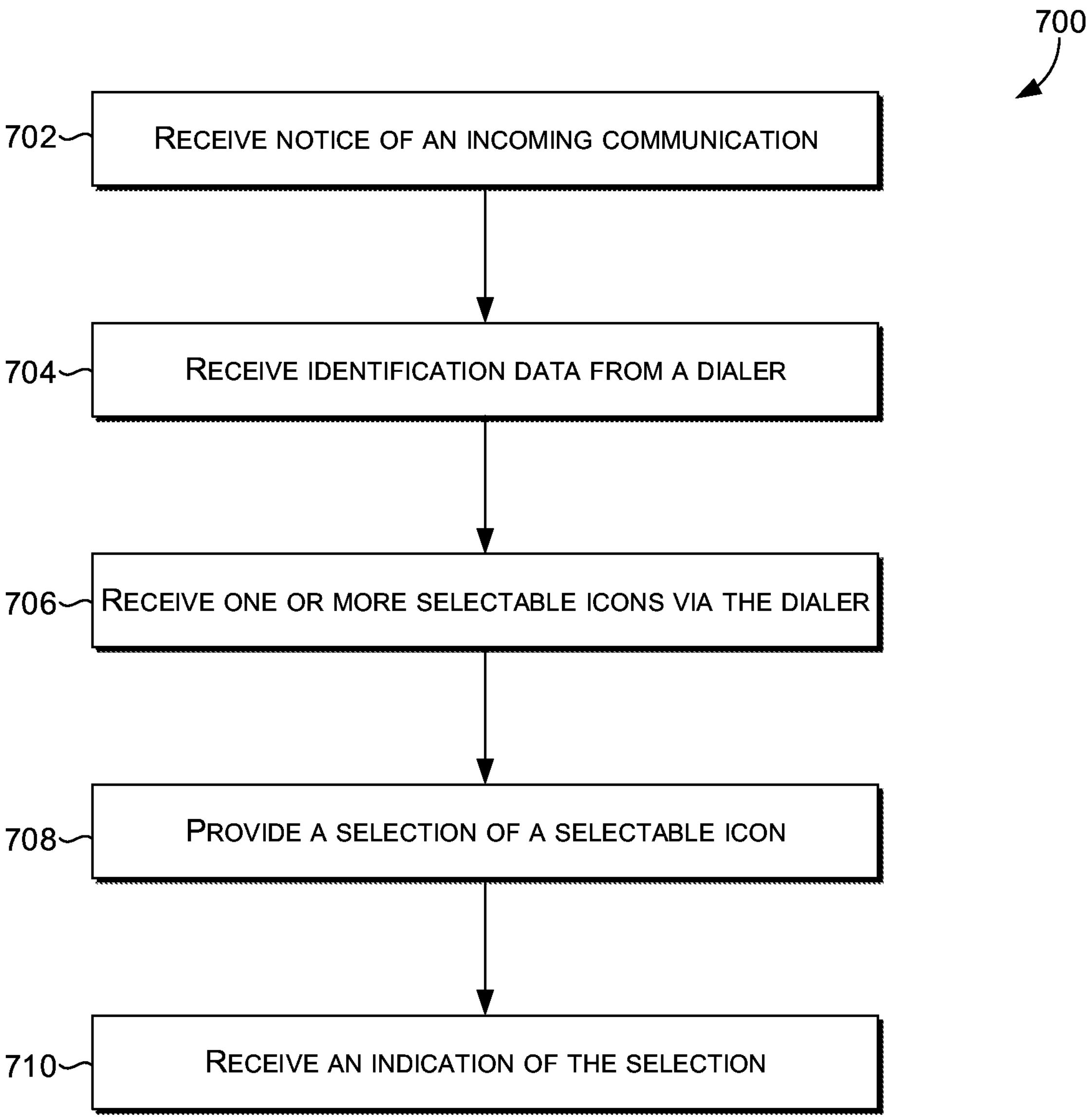

Turning now to FIG. 7, example flowchart 700 of a method from the perspective of a user begins at begins at 702 with receiving a notice of an incoming communication. For example, the notice may be a noise, words displayed on a GUI of a user device, haptic feedback (e.g., vibrations), or a combination. Additionally, at 704, the user may receive one or more identification data associated with the incoming communication. For example, a dialer application may display the identification data via the GUI. In some aspects, the identification data comprises a telephone number and an indication that the telephone number is associated with an identity information scam, the identity information scam determined based on the feedback from a plurality of other devices. In some aspects, the identification data comprises a telephone number, a name, and an address of a business associated with the telephone number.

At 706, the user receives one or more selectable icons via the dialer. The selectable icon may be associated with the identification data displayed. Additionally, the selectable icon may be selected for providing feedback corresponding to the identification data displayed (e.g., such as whether the identification data displayed is incorrect). In aspects, selection of the selectable icon causes the automatic transmission of the feedback that the incoming audio or textual communication is a scam. In some aspects, a second selectable icon is displayed for blocking communications from another device associated with the audio or textual communication upon selection of the second selectable icon. The second selectable icon may be displayed within a display screen associated with a call duration. In some aspects, a plurality of selectable icons are displayed for indicating a category associated with an incoming scam communication.

At 708, the user provides a selection of one or more of the selectable icons discussed above with respect to 706, or other selectable icons associated with providing feedback to a server associated with the dialer. For example, the selection may cause the automatic transmission of the feedback that confirms that the incoming audio communication is the identity information scam. Additionally, at 710, the user may receive an indication of the selection made. For example, the icon may display a change in appearance during or after the selection. In some aspects, a light or haptic feedback may be provided to indicate that the transmission to the server has occurred. In some aspects, the user receives a confirmation that the server received the feedback. In some aspects, the user receives a notification of an update to information stored in a harmonized database associated with the server and associated with the incoming scam communication.

Figure 8:
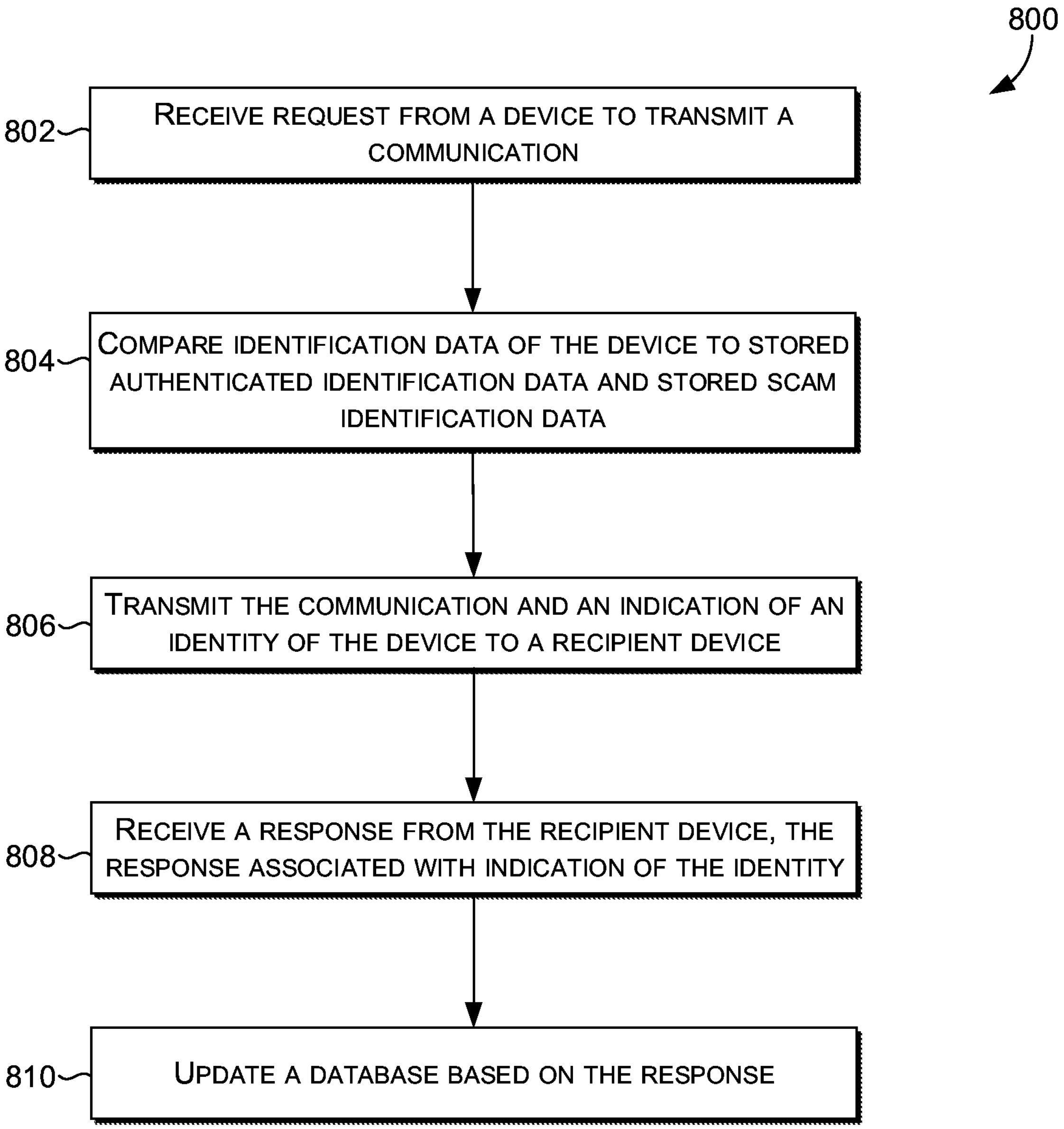

Turning now to FIG. 8, example flowchart 800 of a method from the perspective of the server begins at 802 with receiving a request from a requesting device (e.g., a UE) to transmit a communication to another device (e.g., another UE). In some aspects, the recipient device initiates the dialer application associated with the server upon receipt of the request for communication. At 804, identification data of the requesting device is compared to stored authentication identification data and stored scam identification data. The stored authentication identification data and the stored scam identification data are stored in a harmonized database. In some aspects, the stored authenticated identification data and the stored scam identification data are from a central database comprising identification data from at least two wireless telecommunications carriers, wherein the identification data from the at least two wireless telecommunications carriers is transformed into a standardized format and organized using the location data.

At 806, the communication and an indication of an identity of the requesting device is transmitted to the recipient device. The identity is determined by the server based on comparing the stored authentication identification data and the stored scam identification data. Further, at 808, a response is received from the recipient device. In aspects, the response is associated with the indication. Further, the response is received via the interface displaying the audio or textual communication and the indication of the identity. In aspects, the response comprises a notification that the requesting device is being used for a scam. Additionally, the response may include metadata associated with the communication received by the recipient device. Furthermore, at 810, the server updates the central database based on the response received from the recipient device.

Figure 9:
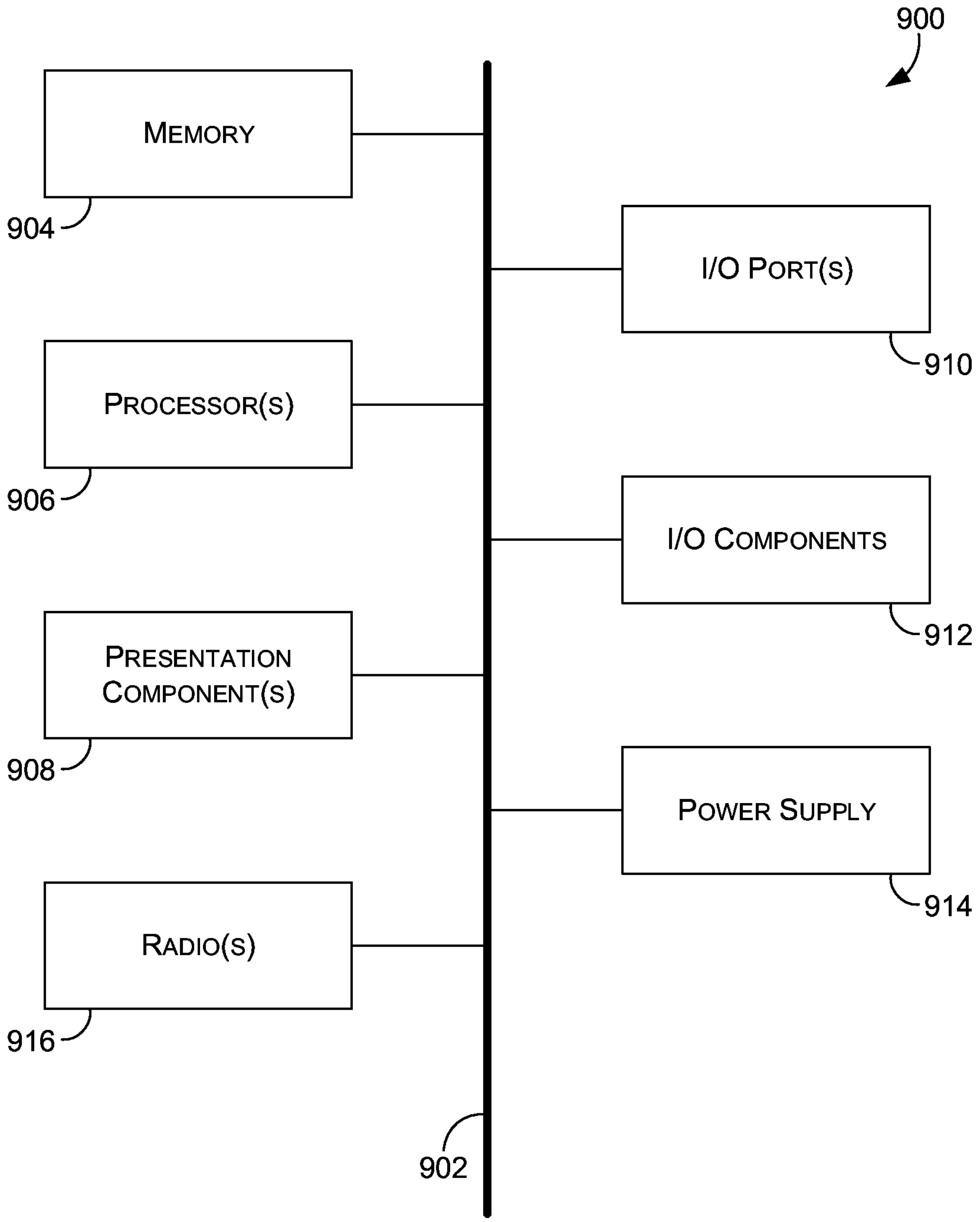
FIG. 9 illustrates an example computing device environment, in accordance with an embodiment of the present technology.

Turning now to FIG. 9, a diagram is depicted of an exemplary computing environment suitable for use in implementations of the present disclosure. In particular, the exemplary computer environment is shown and designated generally as UE/user device 900. User device 900 is but one example of a suitable computing environment and is not intended to suggest any limitation as to the scope of use or functionality of the invention. Neither should user device 900 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 9, user device 900 includes bus 902 that directly or indirectly couples the following devices: memory 904, one or more processors 906, one or more presentation components 908, input/output (I/O) port(s) 910, I/O component(s) 912, power supply 914, and radio(s) 916. Bus 902 represents what may be one or more busses (such as an address bus, data bus, or combination thereof). Although the devices of FIG. 9 are shown with lines for the sake of clarity, in reality, delineating various components is not so clear, and metaphorically, the lines would more accurately be grey and fuzzy. For example, one may consider a presentation component such as a display device to be one of I/O component(s) 912. Also, processors, such as one or more processors 906, have memory. The present disclosure hereof recognizes that such is the nature of the art, and reiterates that FIG. 9 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 9 and refer to "user device."

User device 900 typically includes a variety of computer-readable media. Computer-readable media can be any available media that can be accessed by user device 900. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, DVD or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 904, memory 904 includes computer-storage media in the form of volatile and/or nonvolatile memory. Memory 904 may be removable, nonremovable, or a combination thereof. Examples of memory 904 include solid-state memory, hard drives, optical-disc drives, etc. For instance, memory 904 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 906, the one or more processors 906 read data from various entities such as bus 902, memory 904 or I/O component(s) 912. The one or more processors 906 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 906 execute instructions, for example, of an Operating System of the user device 900 and/or of one or more suitable applications.

Further, the one or more presentation components 908 present data indications to a person or other device. Examples of one or more presentation components 908 include a display device, speaker, printing component, vibrating component, etc. Additionally, I/O port(s) 910 allow user device 900 to be logically coupled to other devices including I/O component(s) 912, some of which may be built in user device 900. Illustrative I/O component (s) 912 may include a microphone, joystick, game pad, satellite dish, scanner, printer, wireless device, etc. Furthermore, power supply 914 may include any suitable source of power, such as a rechargeable lithium polymer battery and/or an alternating current power converter.

Turning to radio 916, the radio 916 facilitates communication with a wireless telecommunications network. For example, radio 916 may facilitate communication via wireless communication signals, RF signals, frames, blocks, transmission streams, packets, messages, data items, and/or data. The terms "radio," "controller," "antenna," and "antenna array" are used interchangeably to refer to one or more software and hardware components that facilitate sending and receiving wireless radio-frequency signals, for example, based on instructions from a cell site. Radio 916 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via mmWaves, FD-MIMO, massive MIMO, 3G, 4G, 5G, and/or 802.11 protocols and techniques, etc.

Illustrative wireless telecommunications technologies that radio 916 may facilitate include CDMA, GPRS, TDMA, GSM, and the like. Radio 916 might additionally or alternatively facilitate other types of wireless communications including Wi-Fi, WiMAX, LTE, or other VoIP communications. As can be appreciated, in various embodiments, radio 916 can be configured to support multiple technologies and/or multiple radios can be utilized to support multiple technologies.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

What is claimed is:

1. A device comprising a dialer having integrated scam protection, the device comprising:

a display;

a processor; and a memory that stores executable instructions that, when executed by the processor, perform operations comprising:

receiving an incoming audio or textual communication;

displaying, via the dialer on the display:

a telephone number associated with the incoming audio or textual communication;

a scam indication identifying the telephone number as a scam; and a selectable icon indicating that the scam indication is a false positive, wherein the false positive means the telephone number is not scam or is no longer scam; and wherein a selection of the selectable icon causes a transmission of information relating to the scam indication being the false positive;

receiving, via the dialer, the selection of the selectable icon via the dialer within a call duration of an audio communication; and based on the selection, automatically transmitting the information, relating to the scam indication being the false positive, to a server.

2. The device of claim 1, wherein the incoming audio or textual communication is the audio communication.

3. The device of claim 1, the operations further comprising:

displaying, via the dialer on the display:

a name indication associated with the telephone number and the incoming audio communication; and a second selectable icon indicating that the name indication is incorrect, wherein a selection of the second selectable icon causes a transmission of information relating to the name indication being incorrect; and upon receiving the selection of the second selectable icon, automatically transmitting the information that the name indication is incorrect to the server during a call duration of the audio communication.

4. The device of claim 1, the operations further comprising:

displaying, via the dialer on the display, a second selectable icon that allows a user of the device to block communications associated with the audio or textual communication; and receiving the selection of the second selectable icon via the dialer within a call duration of the audio communication.

5. The device of claim 1, the operations further comprising:

displaying, via the dialer on the display, location data associated with a second device that initially transmitted the audio or textual communication and a frequency band in which the audio or textual communication was transmitted.

6. The device of claim 5, wherein the location data displayed comprises a time zone associated with the second device.

7. A method for integrated scam protection, the method comprising:

receiving an incoming textual communication;

upon receiving the textual communication, displaying, on a first textual communication user interface:

a scam indicator associated with the incoming textual communication; and a first selectable scam indication icon, selection of which confirms that the scam indicator for the textual communication is correct;

receiving a selection of the first selectable scam indication icon, the selection being made on the first textual communication user interface; and in response to the selection, automatically transmitting the confirmation that the scam indicator for the textual communication is correct to a server;

receiving an indication to answer the textual communication;

displaying, on the first textual communication user interface, a second selectable icon during the textual communication that, upon selection, blocks further communications from another device associated with the textual communication upon selection of the second selectable icon;

receiving the selection of the first selectable scam indication icon via the textual communication user interface;

receiving the selection of the second selectable icon via the textual communication user interface; and blocking, based on the selection of the second selectable icon, a subsequent communication from the other device.

8. The method of claim 7, the method further comprising:

upon receiving the selection of the first selectable scam indication icon, displaying a plurality of selectable scam categories including at least an emergency scam and insurance scam;

receiving a selection of one of the plurality of selectable scam categories; and transmitting the category selected, corresponding to the scam indication, to the server.

9. The method of claim 7, the method further comprising:

in response to the selection, automatically transmitting content of the incoming textual communication to the server.

10. The method of claim 7, wherein the first selectable scam indication icon is displayed within the first textual communication user interface before a response to the textual communication is transmitted, wherein the first selectable scam indication icon is displayed based on feedback from a plurality of other devices, and wherein the method further comprises:

in response to the selection, automatically transmitting, to the server, information indicating whether an audio communication from a telephone number associated with the textual communication had been previously answered by a device displaying the first textual communication user interface.

11. The method of claim 7, wherein the first textual communication user interface comprises a telephone number associated with the textual communication, and wherein the first selectable scam indication icon is displayed within the first textual communication user interface before a response to the textual communication is transmitted.

12. A system comprising:

a memory storing computer-executable instructions; and a processor configured to access the memory and to execute the computer-executable instructions to:

receive a request to transmit an audio or textual communication to a recipient device from a first device, the first device being associated with identification data;

in response to receiving the request, compare the identification data to both stored authenticated identification data and stored scam identification data;

based on comparing the identification data, transmit the audio or textual communication and an indication of an identity of the first device to the recipient device, the audio or textual communication and the indication of the identity transmitted for display on a first user interface associated with a display of the recipient device; and receive a response associated with the indication from the recipient device without the recipient device having to navigate from the first user interface, wherein the response is received based on a selection, at the first user interface, of a selectable icon indicating that the indication of the identity of the first device is incorrect, wherein the indication of the identity comprises a determined caller name or scam label, and the selectable icon indicates the determined identity is incorrect.

13. The system of claim 12, wherein the identification data comprises a telephone number, location data, hardware information, and carrier information.

14. The system of claim 13, wherein the stored authenticated identification data and the stored scam identification data are from a central database comprising identification data from at least two wireless telecommunications carriers, wherein the identification data from the at least two wireless telecommunications carriers is transformed into a standardized format and organized using the location data.

15. The system of claim 14, wherein the response received from the recipient device comprises a notification that the first device is being used for a scam, and wherein the response includes metadata associated with the audio or textual communication.

16. The system of claim 15, wherein the instructions further comprise:

updating the central database based on the response received from the recipient device.

17. The method of claim 7, wherein the operations further comprise:

displaying, on the first textual communication user interface, a second selectable scam indication icon for providing a scam category for the incoming textual communication;

upon receiving a selection of the second selectable scam indication icon, providing a plurality of selectable scam categories associated with the scam indication;

receiving a selection of one of the plurality of selectable scam categories; and transmitting the selected scam category to the server.

18. The method of claim 17, wherein the plurality of categories include a debt scam and an emergency scam.

19. The device of claim 1, the operations further comprising:

receiving the incoming audio communication; and displaying the selectable icon indicating that the scam indication is the false positive upon receiving the incoming audio communication.

* * * * *